March 6, 1951 — E. E. MALLORY — 2,544,390
TIRE PLY TURNDOWN DEVICE
Filed Sept. 24, 1948 — 2 Sheets-Sheet 1
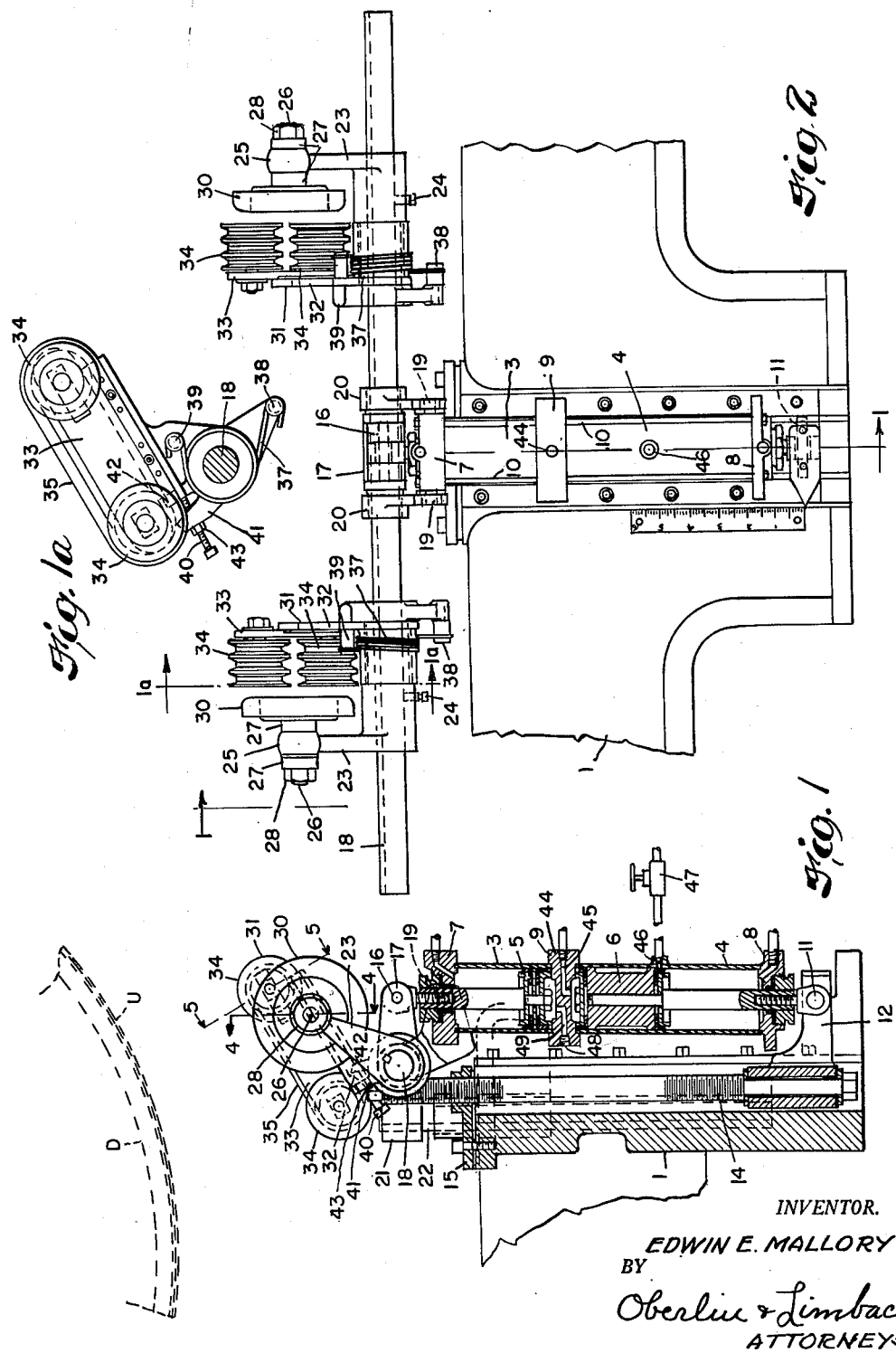
INVENTOR.
EDWIN E. MALLORY
BY
Oberlin & Limbach
ATTORNEYS.

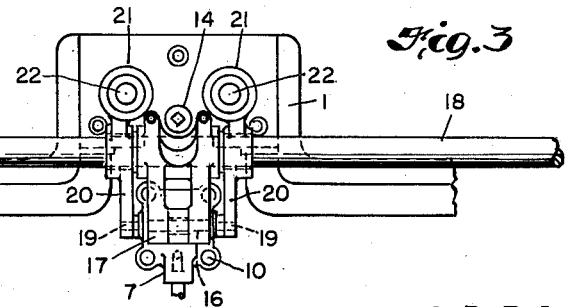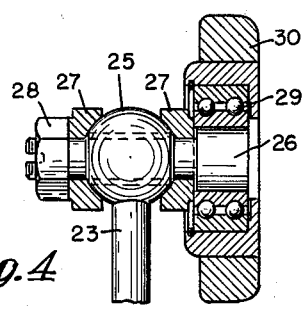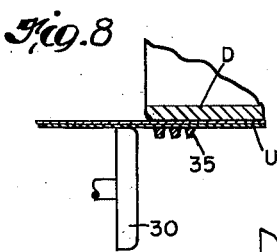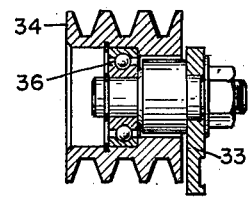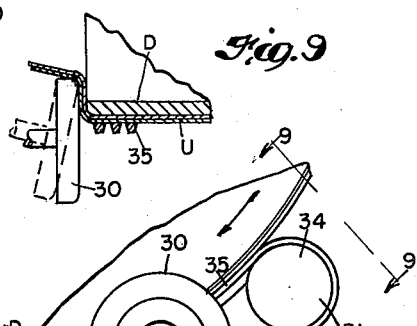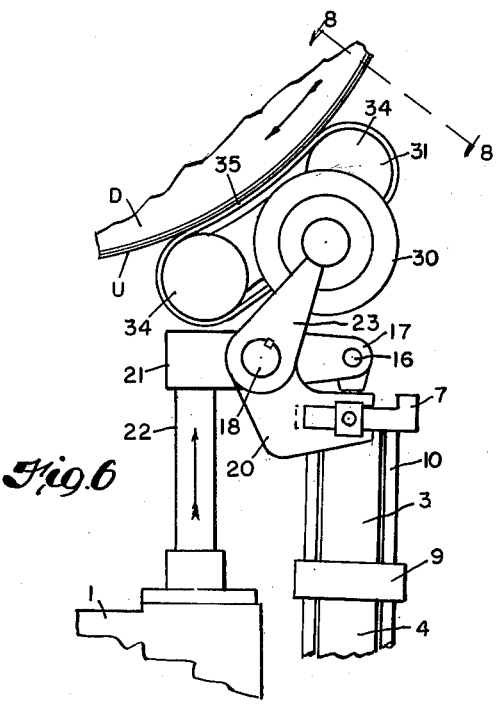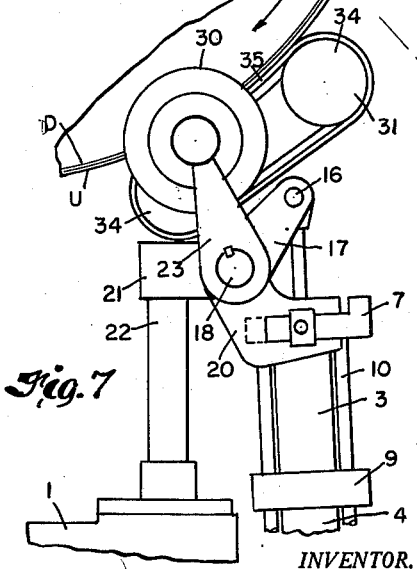

Patented Mar. 6, 1951

2,544,390

UNITED STATES PATENT OFFICE 2,544,390

TIRE PLY TURNDOWN DEVICE

Edwin E. Mallory, Cuyahoga Falls, Ohio, assignor to National Rubber Machinery Company, Akron, Ohio, a corporation of Ohio Application September 24, 1948, Serial No. 51,093

6 Claims. (Cl. 154—10)

The present invention relates generally as indicated to an underply turndown device for a tire building machine and has for one of its primary objects the provision of a device which performs the aforesaid function in a most efficient manner whereby the ply areas operated upon are smooth and free from wrinkles.

Another object is to provide in a device of the character indicated a novel means for effecting a desired sequential operation of the underply hold-down and turndown elements thereof.

Still another object is to provide a unique form of underply holddown element for evenly pressing the ply stock against the periphery of the rotary tire forming drum of the tire building machine adjacent the ends of said drum over areas of considerable circumferential and axial extent to thereby eliminate wrinkling or bunching of the ply stock as is otherwise induced in prior devices wherein such pressure is exerted through a cylindrical roll or the like disposed parallel with the drum axis.

A still further object is to provide a universally adjustable mounting for the ply turndown element which enables positioning thereof for most efficiently performing its function.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

In said annexed drawings:

Fig. 1 is a vertical cross section view of a preferred form of device taken substantially along the line 1—1, Fig. 2, and showing the same in an inoperative or idle position relative to the tire forming drum represented by dotted lines;

Fig. 1a is a cross section view taken substantially along the line 1a—1a, Fig. 2.

Fig. 2 is a front elevation view as viewed from the lefthand side of Fig. 1;

Fig. 3 is a fragmentary top plan view of the central portion of the device;

Fig. 4 is a detail cross section view of one of the turndown elements taken substantially along the line 4—4, Fig. 1;

Fig. 5 is a detail cross section view of one of the hold-down element sheaves taken substantially along the line 5—5, Fig. 1;

Figs. 6 and 7 are schematic views respectively illustrating the device in its initial and final positions; and Figs. 8 and 9 are elevation views as viewed along the lines 8—8 and 9—9 of Figs. 6 and 7 respectively.

Referring now to the drawings and first more especially to Figs. 1–3 thereof, there is shown therein in association with a rotary tire forming drum D having strips of underply U wrapped thereabout so that the marginal edges of the latter extend axially beyond the opposite ends of said drum, a base 1 carrying a power actuating means thereon preferably comprising aligned cylinders 3 and 4 with pistons 5 and 6 reciprocable in each respectively, said cylinders including heads 7 and 8 at their remote ends and a head 9 common to both cylinders interposed between the inner ends thereof. Said cylinders and heads are held together as by the tie bolts 10 to thus constitute a compound cylinder assemblage operating in a manner to be hereinafter more fully explained.

The rod portion of piston 6 is pivotally connected as at 11 to a bracket 12 projecting laterally from said base 1. Said bracket is rendered vertically adjustable in suitable ways in said base as by the screw 14 locked axially relative to said bracket, as best shown in Fig. 1, but rotatable therein and having threaded engagement with a nut plate 15 securely attached to the upper end of the base.

On the other hand, the rod portion of piston 5 is pivotally connected as at 16 to a yoke 17, said yoke in turn being keyed to a rock shaft 18 whereby reciprocation of piston 5 effects a corresponding back and forth rocking movement of said shaft. As shown, the drum and rock shaft axes are parallel.

The upper cylinder head 7 is formed with trunnions 19 each pivotally connected to one end of a pair of arms 20, each of said arms being provided with an intermediate horizontal hub portion through which said rock shaft 18 extends and having its other end formed as a vertical hub 21 rigidly connected to a guide rod 22 vertically slidable in base 1. As shown in Fig. 3, there are two rods 22 parallel to one another, thereby restraining movement of the rock shaft 18 in a vertical plane. It is thus apparent that vertical reciprocation of the cylinder assemblage effects a corresponding bodily reciprocation of the rock shaft 18 as, for example, from the position of Fig. 1 to that of Fig. 6. Likewise, as will hereinafter be more fully explained, the reciprocation of piston 5 in its cylinder will effect rocking of the shaft 18 to effect turning down of the underply U over the ends of drum D, as shown in Fig. 7.

Referring now to the most important features of the present invention, there is slidably keyed on the rock shaft 18 a pair of arms 23 which are locked in a desired axially spaced relation as by means of the set screws 24. Each arm 23 is formed with a hollow spherical end portion 25 through which a bearing stud 26 loosely projects, said stud having opposed rings 27 thereon adapted to be drawn together to clamp the spherical portion 25 therebetween in response to tightening of the nut 28 having threaded engagement with one end of said stud. With this arrangement it is possible to universally adjust the stud in said arm to any desired angle relative to the axis of the rock shaft 18.

Journalled on the inner end of each stud 26 as by the interposed bearing 29 is a turndown roll 30 having its smooth and flat inner face positioned a slight distance axially beyond the corresponding end of the drum D whereby movement of both of said rolls inwardly across the ends of said drum effects a turning in or "turndown" of the overhanging marginal edges of the underply U.

Although in the drawings the inner face of each roll 30 is shown as lying in a plane perpendicular to the forming drum and rock shaft axes, it has been found desirable to position such inner face so as to be slightly askew, as represented by the dotted lines in Fig. 9. In this way the turndown rolls tend to more smoothly lead or wipe the underply U into the "turndown" position.

In order to hold the underply U in place against wrinkling or bunching on the periphery of the drum D there is pivotally mounted on each arm 23 a holddown assembly 31 herein illustrated as comprising an arm 32 provided with a hub encircling the hub of arm 23 and a plate 33 having a tongue and groove connection with said arm 32, said plate 33 carrying at its opposite ends a pair of sheaves 34 over which pass endless rubber or like belts 35. Said sheaves are supported on bearings 36 (see Fig. 5) for free rotation when said belts are pressed into engagement with the outer surface of the underply U as shown in Figs. 8 and 9.

Said arms 23 and 32 are yieldably held in the relative positions of Figs. 1 and 6 by means of torsion springs 37, each having its ends hooked over pins 38, 39 on said arms respectively. Stopping each of said arms 23 and 32 in a predetermined angular position relative to one another is an adjustable limiting stop means comprising as for example a bolt 40 threaded through a lug 41 on arm 23 with its end engaged with a similar lug 42 on arm 32, said bolt being locked in any adjusted position by means of the jam nut 43 engaged with lug 41. This adjustable limiting stop means is most clearly shown in Fig. 1a.

With reference to Fig. 1 in which the device is shown in an inoperative or idle position relative to the drum D it is evident that upon admission of fluid under pressure into the common head 9 through the port 44 and passage 45, the entire cylinder assemblage will move upwardly to effect engagement of the belts 35 of the holddown element with the underply U on said drum, as shown in Figs. 6 and 8. Thus, fluid admitted into the space between the end of the lower piston 6 and the common head 9 effects raising of the cylinder assemblage and corresponding movement of the rock shaft to the position of Fig. 6.

At this stage of the operation, the port 46 in the lower cylinder 4 will be uncovered by the piston 6 therein. Said port 46 is preferably connected with a suitable restrictor valve 47 or the like through which the fluid will leak at a predetermined rate to the port 48 and through passage 49 in head 9 to act on piston 5 to maintain a desired pressure between the belts 35 now stretched to arcuate form around the underply U, and further to regulate the speed of movement of the upper piston 5, it being desirable that the device be brought into its initial position of Fig. 6 with minimum delay and thereafter slowly actuated to cause the turndown rolls 30 to progressively turndown the underply U as shown in Fig. 9 while the drum D is rotating.

As best shown in Figs. 7 and 9, the aforesaid movement of the upper piston 5 effects turning down of the axially projecting marginal edges of the underply U by rocking the rock shaft 18 and causing the turndown rolls 30 to move inward across the ends of the drum D and thereby turn down the underply as clearly shown in Fig. 9.

During this entire operation the belts 35 are yieldably held against the underply U to thus simulate hand operations wherein the palm of the operator's hand is evenly pressed against the underply U to hold the same against wrinkling during the slow progressive advance of the rolls 30 inward across the ends of the drum D.

Having thus described one embodiment of the present invention it is now understandable that the same is not only extremely simple in construction and operation but presents several new features not heretofore contemplated in prior art devices of a similar nature.

The present invention constitutes a further improvement over the device disclosed in the copending application of Edwin E. Mallory et al., Serial No. 744,736, filed April 29, 1947, now Patent No. 2,529,509.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A ply turndown device for tire building machines comprising a base, a guide reciprocable in said base, a transversely disposed shaft rotatable in and reciprocable with said guide, a ply hold down element rotatable on said shaft, a ply turn down element keyed on said shaft axially adjacent said hold down element, and means connected to said guide and to said shaft operative to successively move said guide in one direction and rotate said shaft in one direction, said hold down element comprising spaced sheaves mounted for rotation about axes generally parallel to said shaft, and an endless belt running over said sheaves.

2. A ply turndown device for tire building machines comprising a base, a guide reciprocable in said base, a transversely disposed shaft rotatable in and reciprocable with said guide, a ply hold down element rotatable on said shaft, a ply turndown element keyed on said shaft axially adjacent said hold down element, and means connected to said guide and to said shaft operative to successively move said guide in one direction and rotate said shaft in one direction, said hold down element comprising freely rotatable spaced sheaves mounted for rotation about axes generally parallel to said shaft, and an endless belt running over said sheaves.

3. The combination with a rotary tire building drum adapted to carry ply stock thereabout projecting axially beyond one end, of a ply turndown device comprising axially adjacent hold down and turndown elements respectively and successively movable into contact with the ply stock adjacent such one end of said drum to thereby hold the ply stock against the periphery of the drum and across such one end of said drum to thereby turn the projecting end of the ply stock inwardly over such end of said drum, and means for moving said elements as aforesaid, said hold down element including a ply contacting surface extending circumferentially along the ply stock in opposite directions from the region of the ply stock operated upon by said turndown element during movement of the latter across such one end of said drum.

4. The combination with a rotary tire building drum adapted to carry ply stock thereabout projecting axially beyond one end, of a ply turndown device comprising axially adjacent hold down and turndown elements respectively and successively movable into contact with the ply stock adjacent such one end of said drum to thereby hold the ply stock against the periphery of the drum and across such one end of said drum to thereby turn the projecting end of the ply stock inwardly over such end of said drum, and means for moving said elements as aforesaid, said hold down element including a deformable ply contacting surface conforming with the curvature of the ply stock when said hold down element is moved into contact therewith and extending circumferentially in opposite directions from the region of the ply stock operated upon by said turndown element during movement of the latter across such one end of said drum.

5. The combination with a rotary tire building drum adapted to carry ply stock thereabout projecting axially beyond one end, of a ply turndown device comprising axially adjacent hold down and turndown elements respectively and successively movable into contact with the ply stock adjacent such one end of said drum to thereby hold the ply stock against the periphery of the drum and across such one end of said drum to thereby turn the projecting end of the ply stock inwardly over such end of said drum, and means for moving said elements as aforesaid, said hold down element including a pair of spaced sheaves, and an endless belt trained over said sheaves, said belt having one side thereof disposed tangent to said drum and the ply stock thereon and deformable to conform with the curvature of the ply stock when said hold down element is moved into contact with the ply stock and to extend circumferentially in opposite directions from the region of the ply stock operated upon by said turndown element during movement of the latter across such one end of said drum.

6. The combination with a rotary tire building drum adapted to carry ply stock thereabout projecting axially beyond one end, of a ply turndown device comprising axially adjacent hold down and turndown elements respectively and successively movable into contact with the ply stock adjacent such one end of said drum to thereby hold the ply stock against the periphery of the drum and across such one end of said drum to thereby turn the projecting end of the ply stock inwardly over such end of said drum, and means for moving said elements as aforesaid, said hold down element including a ply contacting surface extending circumferentially along the ply stock from the region of the ply stock operated upon by said turndown element during movement of the latter across such one end of said drum.

EDWIN E. MALLORY.

REFERENCES CITED

The following references are of record in the file of this patent:

UNITED STATES PATENTS

| Number | Name | Date |
| --- | --- | --- |
| Re. 18,394 | Warner | Mar. 22, 1932 |
| 1,760,929 | Wikle | June 3, 1930 |
| 1,981,828 | Shook | Nov. 20, 1934 |
| 2,083,886 | White | June 15, 1937 |
| 2,088,889 | Wikle | Aug. 3, 1937 |
| 2,339,551 | Stevens | Jan. 18, 1944 |
| 2,381,379 | Stevens | Aug. 7, 1945 |
| 2,394,318 | McChesney | Feb. 5, 1946 |